No. 850,934. PATENTED APR. 23, 1907.
H. A. HOUSEMAN.
MECHANICAL MOVEMENT.
APPLICATION FILED MAY 28, 1903.

4 SHEETS—SHEET 1.

WITNESSES:

INVENTOR
Harry A. Houseman
BY
Harding & Harding
ATTORNEYS

No. 850,934. PATENTED APR. 23, 1907.
H. A. HOUSEMAN.
MECHANICAL MOVEMENT.
APPLICATION FILED MAY 28, 1903.

4 SHEETS—SHEET 2.

WITNESSES:

INVENTOR

BY

ATTORNEYS

No. 850,934. PATENTED APR. 23, 1907.
H. A. HOUSEMAN.
MECHANICAL MOVEMENT.
APPLICATION FILED MAY 28, 1903.

4 SHEETS—SHEET 3.

WITNESSES:

INVENTOR

BY

ATTORNEYS

No. 850,934. PATENTED APR. 23, 1907.
H. A. HOUSEMAN.
MECHANICAL MOVEMENT.
APPLICATION FILED MAY 28, 1903.

4 SHEETS—SHEET 4.

WITNESSES:

INVENTOR

BY

ATTORNEYS

UNITED STATES PATENT OFFICE.

HARRY A. HOUSEMAN, OF PHILADELPHIA, PENNSYLVANIA, ASSIGNOR TO STANDARD MACHINE COMPANY, OF PHILADELPHIA, PENNSYLVANIA, A CORPORATION OF PENNSYLVANIA.

MECHANICAL MOVEMENT.

No. 850,934.     Specification of Letters Patent.     Patented April 23, 1907.

Application filed May 28, 1903. Serial No. 159,056.

*To all whom it may concern:*

Be it known that I, HARRY A. HOUSEMAN, a citizen of the United States, residing at Philadelphia, county of Philadelphia, and State of Pennsylvania, have invented a new and useful Improvement in Mechanical Movements, of which the following is a full, clear, and exact description, reference being had to the accompanying drawings, which form a part of this specification.

The object of my invention is to intermittently operate a gear or other driving wheel from a continuously-driven wheel. I carry out this object by means of the train of mechanism or mechanical movement hereinafter described.

Figure 1:
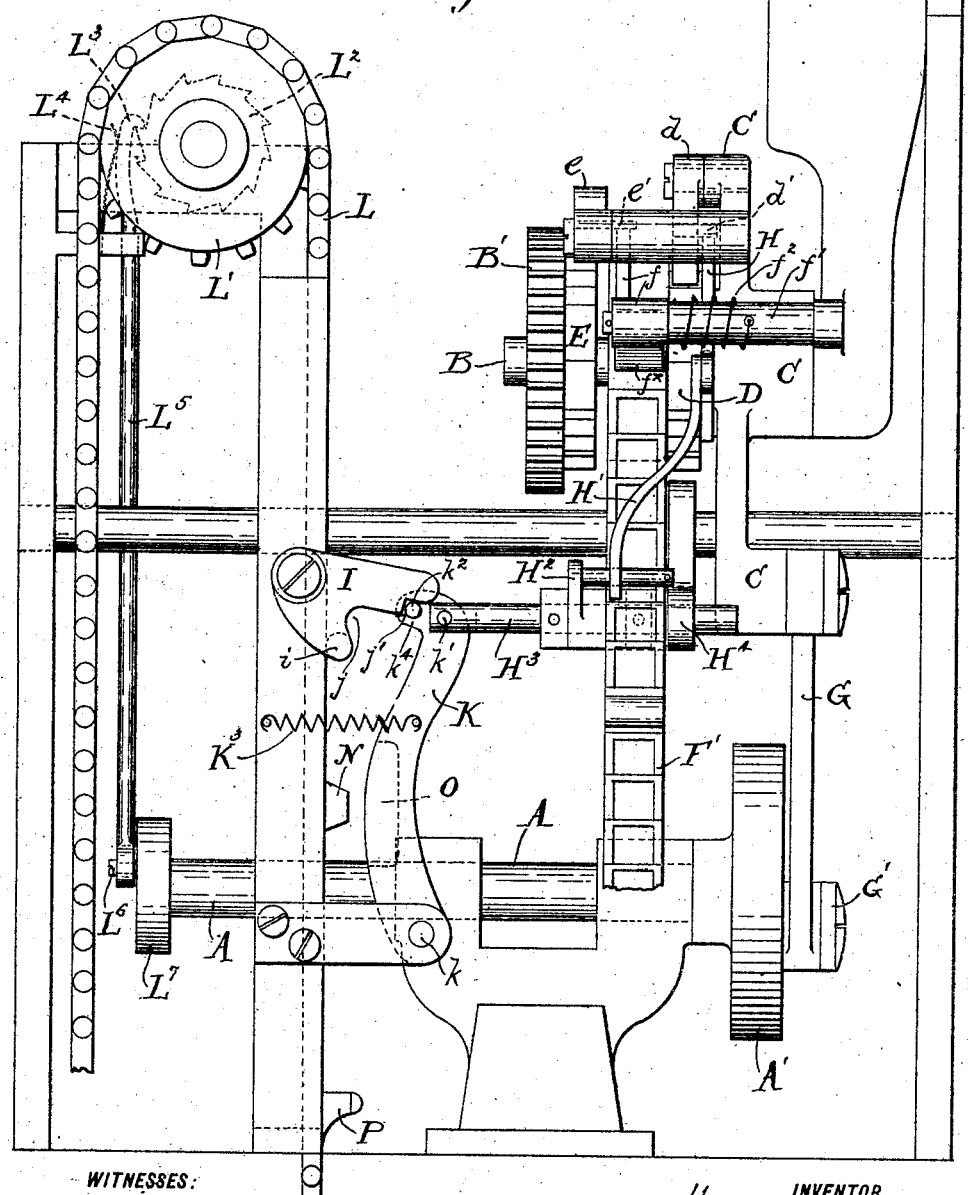
Figure 2:
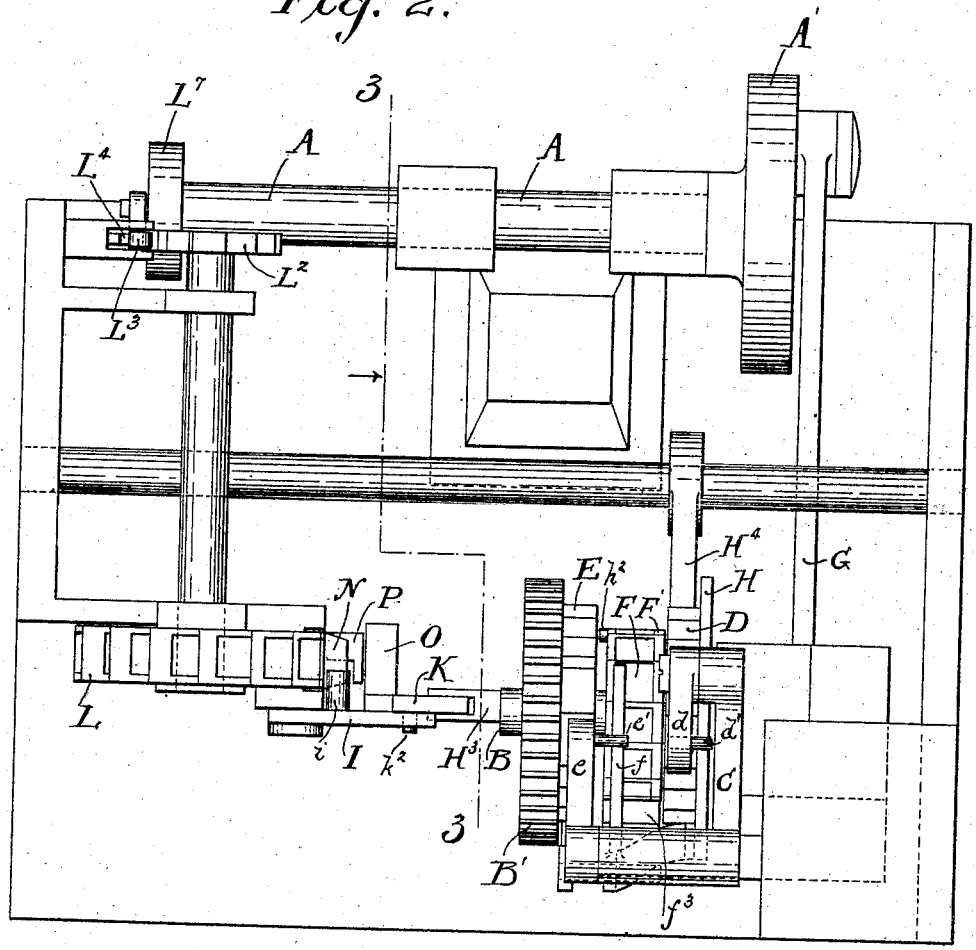
Figure 3:
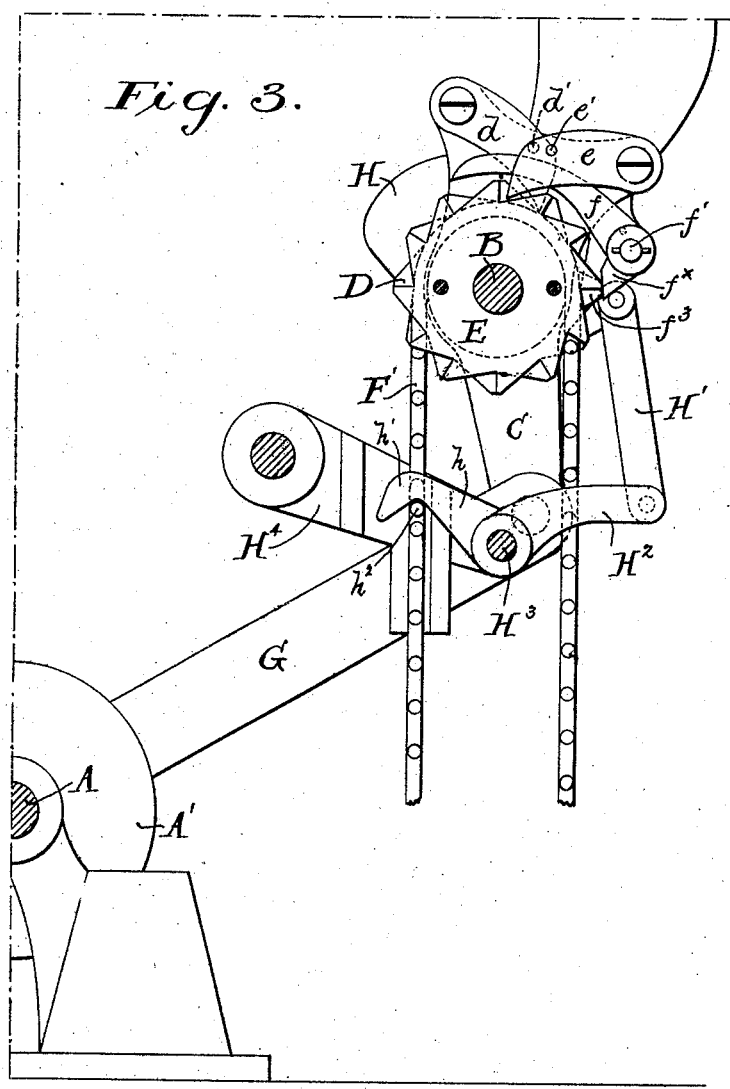
Figure 4:
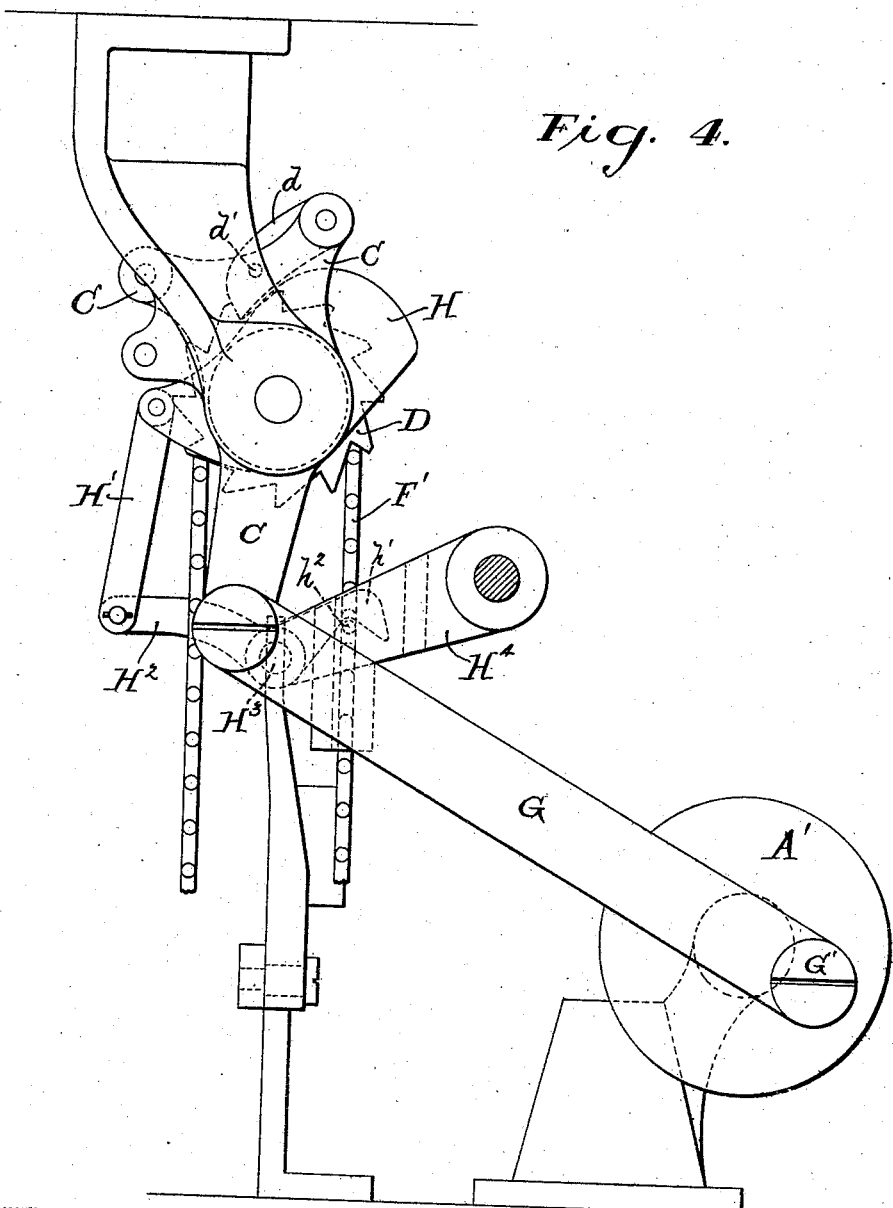

In the drawings, Figure 1 is a front elevation. Fig. 2 is a plan view. Fig. 3 is a section on the line 3 3, Fig. 2. Fig. 4 is a side elevation.

A is the main driving-shaft, having the driving-wheel A'. B' is a wheel to be intermittently driven. B is a stud upon which said wheel B' is loosely supported. Secured to this wheel B' is the ratchet-wheel E, operated by the pivoted pawl $e$. D is a ratchet-wheel, also loose upon the stud B, to which is connected the sprocket-wheel F, driving the sprocket-chain F'. $d$ is a pivoted pawl for operating the ratchet-wheel D. These pawls $d$ and $e$ are connected to the frame C, which is connected to the connecting-rod G, which connecting-rod G in turn is connected to the crank G', operated by the driving-wheel A'. $f$ is a pivoted lever pivoted upon the stud $f'$ and acted upon by a spring $f^2$, normally holding it in its upward position in contact with a pin $e'$ on the pawl $e$, thus holding the pawl $e$ out of engagement with its ratchet-wheel E. Under these conditions if power be applied to the wheel A' the ratchet-wheel D will be operated tooth by tooth, moving the sprocket-wheel and chain without affecting the ratchet-wheel E and its carried wheel B'. Upon the lever $f$ is a tailpiece $f^\times$ in line of movement of a lug $f^3$ on the chain F'. When this lug $f^3$ strikes the tailpiece $f^2$, the tailpiece $f^2$ is moved upwardly against the action of its spring, depressing the lever $f$, releasing the pawl $e$ and allowing it to operate upon the ratchet-wheel E. By this means a determinate intermittent movement may be given to the wheel B' from the driven wheel A'. The intermittent movement may be varied as desired, dependent upon the number and position of such lugs $f^3$ upon the chain.

In order to throw the pawl $d$ out of action and stop the operation of the mechanical movement without stopping the wheel A', I provide the following mechanism: H is a cam, which in one position contacts with the pin $d'$, holding the pawl $d$ out of engagement with its ratchet-wheel D. To this cam is connected a link H', which latter is connected to a bell-crank lever H². This bell-crank lever H² is rotatably secured to a shaft H³, mounted on the end of an arm H⁴, secured to the frame of the machine. The shaft H³ is so mounted in the arm H⁴ as to be capable of a lateral movement. One member $h$ of the bell-crank H² is provided with a hooked portion $h'$, which in one position is in alinement with a pin $h^2$ upon the chain F'. When this lug $h^2$ strikes the hook $h'$ of the bell-crank H², it lifts the bell-crank lever H², elevating the cam H and raising the pawl $d$ out of action, thus stopping all connection between continuously-moving driving-wheel and the intermittent gear.

In order to throw the pawl $d$ into connection with its ratchet D and resume the connection between the continuously-driven wheel and the intermittently-driven wheel, I provide the following mechanism: Secured to the frame of the machine is the gravity-pawl I, having at one portion the pin or roller $i$ and two jaws portions $j\ j'$. K is a lever pivoted to the frame of the machine at $k$, and to which lever by the pin $k'$ the shaft H³ is connected. This lever has a portion $k^4$ projecting beyond the connection $k'$, said projecting portion having pin $k^2$. Fig. 1 shows the position of the machine when pawl $d$ is engaged with the ratchet D and the shaft H³ held in the position shown by means of the pin $k^2$ resting in the jaw $j'$ of the gravity-pawl I and the lever K also held in the position shown in that figure against the action of the spring K³ and the lever $h$ is in position to be acted on by the pin $h^2$. L is a pattern-chain moving upon wheel L', operated by the ratchet-wheel L². The pawl L³, held in engagement with the ratchet L² by spring L⁴, operates to continuously move chain L. This pawl is operated by means of the connecting-rod L⁵ and crank L⁶, connected to the crank-wheel L⁷ upon the main driving-shaft A. Upon the chain L is a lug N, in line of movement of which is a roller $i$. When the lever $h$ has been operated upon by the pin $h^2$ upon the chain F' so as to throw pawl $d$ out of action with its corresponding ratchet-wheel D, said pawl $d$ remains out of action until the lug N strikes the roller $i$, moving the gravity-pawl I on its pivot and releasing the connection between the pin $k^2$ and jaw $j'$, allowing spring $K^3$ to act to move the shaft $H^3$ laterally until the pin $k^2$ rests in the jaw $j$ of the pawl I. This action moves the lever $h$ from alinement with the pin $h^2$ on the chain F', causing resumption of connection between the continuously-moving driving-wheel and the intermittently-driven wheel and the pin upon the chain will pass beyond the lever $h$. In order to bring the lever $h$ again into such alinement with chain F' as to allow the same pin $h^2$ or a similar pin upon that chain to again release the pawl $d$ from its ratchet D, I provide the following means: Upon the chain L is a lug P, having a portion cut away, the cut-away portion being in alinement with the pin or roller $i^3$, so that the lug P produces no direct action upon the gravity-pawl I. Upon the lever K is a projecting portion O, which is in line with the lug P, and when the lug P strikes projection O the lever K is moved against the action of the spring $K^3$, forcing the shaft $H^3$ and the other mechanism into the position shown in Fig. 1, the gravity-pawl I locking the shaft $H^3$ in that position, due to the pin $k^2$ resting in the jaw $j'$ of the gravity-pawl I.

I have used the hereinbefore-described mechanical movement in practice in connection with a circular-knitting machine for the purpose of operating a rotary cam intermittently, although, of course, I do not intend to limit its use to this purpose or to any particular purpose.

Having now fully described my invention, what I claim, and desire to protect by Letters Patent, is—

1. In combination, a driving-wheel, a pawl driven from said driving-wheel, a ratchet which said pawl operates, a wheel operated by said ratchet, a second pawl also driven from said driving-wheel, a ratchet which said pawl operates, pattern mechanism operated by said last-mentioned ratchet, said pattern mechanism adapted to control the operative connection between the first-mentioned pawl and its ratchet, pawl-controlling mechanism for said second pawl, said pattern mechanism being adapted to operate said pawl-controlling mechanism and release the second pawl from connection with its ratchet, and means to move said pawl-controlling mechanism into and out of line of the pattern mechanism.

2. In combination, a driving-wheel, a pivoted pawl driven from said driving-wheel, a ratchet which said pawl operates, a wheel driven by said ratchet-wheel, a lever normally holding said pawl out of action, a second pawl driven from said driving-wheel, a ratchet which said second pawl drives, a cam normally out of contact with said second pawl, a pattern-chain driven by said last-mentioned ratchet, said pattern-chain having a lug adapted to release the first-mentioned lever from its pawl and a lug adapted to move the cam into engagement with its pawl and move said pawl out of action, a laterally-movable spring-actuated shaft, said cam being secured to said shaft, a locking device normally holding said second-mentioned lever in alinement with its corresponding lug on the pattern-chain, a second pattern mechanism adapted in its movement to release said locking device.

3. In combination, a driving-wheel, a pivoted pawl driven from said driving-wheel, a ratchet which said pawl operates, a wheel driven by said ratchet-wheel, a lever normally holding said pawl out of action, a second pawl driven from said driving-wheel, a ratchet which said second pawl drives, a cam normally out of contact with said second pawl, a pattern-chain driven by said last-mentioned ratchet, said pattern-chain having a lug adapted to release the first-mentioned lever from its pawl and a lug adapted to move the cam into engagement with its pawl and move said pawl out of action, a laterally-movable spring-actuated shaft, said second-mentioned lever being secured to said shaft, a locking device normally holding said second-mentioned lever in alinement with its corresponding lug on the pattern-chain, a second pattern mechanism adapted in its movement to release said locking device, a lever to which the laterally-moving shaft is connected, said shaft-lever being in line of movement of said pattern mechanism and adapted when struck thereby to move said shaft to return the cam into alinement with its lug on the first-mentioned pattern-chain.

In testimony of which invention I have hereunto set my hand, at Philadelphia, on this 22d day of May, 1903.

HARRY A. HOUSEMAN.

Witnesses:
CHAS. COBB VAN RIPER,
M. M. HAMILTON.